Aug. 1, 1950

J. D. BENNEK 2,517,168

POULTRY TONGS

Filed June 3, 1946

JOHN D. BENNEK
INVENTOR

BY

Patented Aug. 1, 1950

2,517,168

UNITED STATES PATENT OFFICE 2,517,168

POULTRY TONGS

John D. Bennek, Milwaukee, Wis.

Application June 3, 1946, Serial No. 673,915

2 Claims. (Cl. 17—11)

This invention relates to tongs having particular application to dressing poultry and small animals.

The object of the invention is to provide a useful implement to be employed in eviscerating poultry or small animals and the like and to provide an implement of such utility which will be of improved and practical design.

Another object of the invention is to provide a tongs to be used in the dressing and cleaning of poultry and the like by which various parts of the bird or animal may be firmly and effectively grasped and removed or disjointed.

Another object of the invention is to provide a tongs to be used in the dressing and cleaning of animals and the like having means whereby the sinews of poultry and windpipes of the same may be easily grasped and removed.

Other objects of the invention will become apparent in the following description of an embodiment of the invention and in the accompanying drawings.

The device comprises a pair of handles 1, 1' which are pivotally connected at one end to open and close a pair of jaws 2, 2' disposed at the other end.

Figure 1:
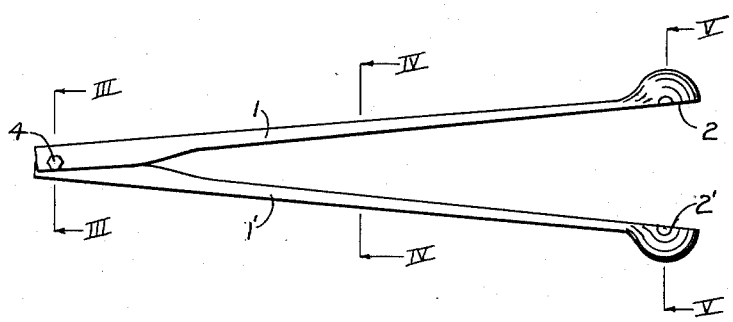
Figure 1 is a top plan view of the open tongs.
Figure 2:
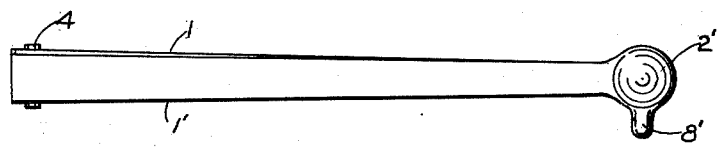
Fig. 2 is a side elevation view of the tongs.
Figure 3:
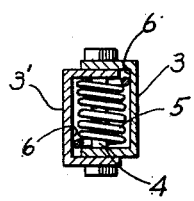
Fig. 3 is a detailed cross-sectional view taken through the pivot on line III—III of Fig. 1.
Figure 4:
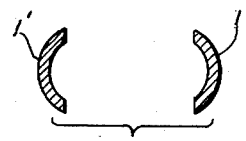
Fig. 4 is a similar cross-section through the handle taken on line IV—IV of Fig. 1.

The tongs as shown in the accompanying drawing have handles 1, 1' and jaws 2, 2' stamped integrally of metal and forming two complementary parts. The curved cross-section of the handles 1, 1' as shown in Fig. 3 is designed for strength and rigidity. The handles 1, 1' should also be sufficiently long to reach fully within the body of the bird or animal.

Figure 5:
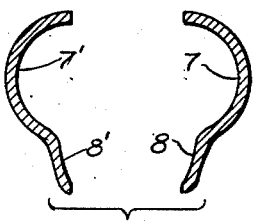
Fig. 5 is a similar cross-section through the jaw taken on line V—V of Fig. 1.

The jaws 2, 2' of the tongs are two hemispherical or cup-shaped elements 7, 7' with peripheral edges in opposed abutting alignment and having integrally formed therewith corresponding downward projections 8, 8' or fingers. The projections 8, 8' are also cup-shaped and merge with the two elements 7, 7', as shown in Fig. 5 of the drawings.

The most practical size of the elements and of the projections is determined by the size of the bird or animal to be prepared. For chickens, jaw elements of about one and one-quarter inch in diameter and a projection of about one-half inch has been found most satisfactory.

The handles 1, 1' are pivotally connected near the corresponding ends opposite the jaws by means of the overlapping channel members 3, 3' of the handles having a pin 4 or bolt extending therethrough as shown in Fig. 3. The handles 1, 1' at the pivoting end should be of substantial width so that the jaws 2, 2' are prevented from any relative movement other than the pivotal movement provided for and so that a firm, positive clamping action can be obtained.

A spring 5 positioned on the pin 4 and making pressure contact against the inner surfaces 6 of the two handles 1, 1' maintains the tongs in a normally open position.

The small portion of the handles and channel members 3, 3' extending beyond the pin 4 on the opposite side from the jaws prevents the jaws 2, 2' from opening farther than desired.

The abutting edges of the jaws should not be so sharp that the organs of the chicken are easily cut. It is intended that the tongs be designed so that whole organs may be torn intact from the chicken by grasping the same between the two cup-shaped elements.

The tongs also greatly facilitate disjointing the chicken. By grasping a joint with the projecting fingers and twisting, the joint is quickly and easily severed.

Figure 6:
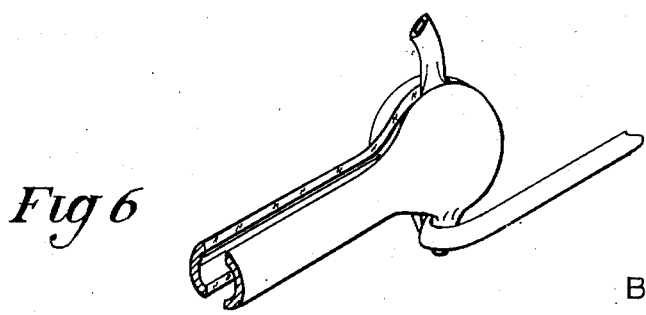
Fig. 6 shows a windpipe secured by the tongs.

When the windpipe of a chicken or other sinewy viscera is to be removed, the jaws are clamped about the windpipe and twisted so that the windpipe, wound around the jaws, becomes fast over the projection and may then be withdrawn as desired, as illustrated in Fig. 6.

Various embodiments of the invention may be employed within the scope of the accompanying claims.

I claim:

1. Tongs for dressing poultry and the like, comprising a pair of long substantially straight tong members pivoted together at one end and having the corresponding other ends thereof free to move toward and away from each other, a pair of complementary substantially semispherical cupped jaws integral with said free ends and having the hollow faces thereof facing each other with the rims adapted to close together to clamp parts retained thereby in operation, and a pair of complementary outward extensions for the opposed rims disposed at right angles to said tong members in the plane of the faces of said jaws to facilitate evisceration of poultry.

2. Tongs for dressing poultry and the like, comprising a pair of long substantially straight channel tong members facing each other and having the channel sides at the handle end thereof overlapping, a pivot pin extending through said overlapping sides at the end of said tong members, a spring carried by said pivot pin and disposed to bias the free ends of said tong members apart, the opposite free ends of said tong members being formed to provide a pair of complementary substantially semi-spherical cupped jaws having their rims aligned to close together in clamping an object retained thereby, and a pair of complementary outward extensions formed in said opposed jaw rims and disposed substantially at right angles to said tong members in the meeting plane of said rims to facilitate evisceration of poultry.

JOHN D. BENNEK.

REFERENCES CITED

The following references are of record in the file of this patent:

UNITED STATES PATENTS

| Number | Name | Date |
| --- | --- | --- |
| 254,631 | Fisher | Mar. 7, 1882 |
| 717,206 | Jacoby | Dec. 30, 1902 |
| 850,319 | Robinson | Apr. 16, 1907 |
| 1,488,351 | Kilian | Mar. 25, 1924 |

FOREIGN PATENTS

| Number | Country | Date |
| --- | --- | --- |
| 134,033 | Germany | Oct. 3, 1902 |
| 133,750 | Switzerland | Dec. 16, 1929 |